US008558132B2

(12) United States Patent
Daboub et al.

(10) Patent No.: US 8,558,132 B2
(45) Date of Patent: Oct. 15, 2013

(54) DOCUMENT SORTING MACHINE

(75) Inventors: Brent A. Daboub, Fort Worth, TX (US); Federico Ayala, Grand Prairie, TX (US)

(73) Assignee: National Presort, Inc., Fort Worth, TX (US)

( * ) Notice: Subject to any disclaimer, the term of this patent is extended or adjusted under 35 U.S.C. 154(b) by 0 days.

(21) Appl. No.: 13/098,064

(22) Filed: Apr. 29, 2011

(65) Prior Publication Data

US 2012/0274020 A1 Nov. 1, 2012

(51) Int. Cl.
*G06K 9/00* (2006.01)
*B65H 29/54* (2006.01)

(52) U.S. Cl.
USPC ............................ 209/584; 209/900; 271/306

(58) Field of Classification Search
USPC ................ 271/303, 306–308, 181–191, 31.1, 271/9.07; 209/584, 900
See application file for complete search history.

(56) References Cited

U.S. PATENT DOCUMENTS

| | | | | |
|---|---|---|---|---|
| 3,905,896 | A | 9/1975 | Jackson et al. | |
| 4,140,627 | A | 2/1979 | Weller et al. | |
| 4,488,610 | A | 12/1984 | Yankloski | |
| 5,363,971 | A | 11/1994 | Weeks et al. | |
| 5,419,457 | A | 5/1995 | Ross et al. | |
| 5,689,795 | A | 11/1997 | Mastrandrea | |
| 6,561,360 | B1 | 5/2003 | Kalm et al. | |
| 6,676,127 | B2 | 1/2004 | Johnson et al. | |
| 7,004,396 | B1 | 2/2006 | Quine et al. | |
| 7,170,024 | B2 * | 1/2007 | Burns et al. | 209/584 |
| 7,397,010 | B2 * | 7/2008 | Wilke | 209/584 |
| 7,414,218 | B2 * | 8/2008 | Wheeler et al. | 209/584 |
| 7,589,294 | B2 * | 9/2009 | Burns et al. | 209/584 |
| 7,868,264 | B2 | 1/2011 | Stemmle et al. | |
| 8,035,053 | B2 * | 10/2011 | Skrdlant et al. | 209/584 |
| 8,136,671 | B1 | 3/2012 | Daboub et al. | |
| 2003/0038065 | A1 | 2/2003 | Pippin et al. | |
| 2005/0194294 | A1 * | 9/2005 | Oexle et al. | 209/584 |
| 2005/0247606 | A1 | 11/2005 | Redford et al. | |
| 2006/0102529 | A1 * | 5/2006 | Wilke | 209/584 |

(Continued)

FOREIGN PATENT DOCUMENTS

WO WO2006/110486 A2 10/2006

OTHER PUBLICATIONS

U.S. Office Action from corresponding U.S. Appl. No. 12/583,310, issued by the United States Patent and Trademark Office on Sep. 9, 2011.

(Continued)

*Primary Examiner* — Patrick Cicchino

(74) *Attorney, Agent, or Firm* — James E. Walton; Richard G. Eldredge

(57) ABSTRACT

A machine and method to sort documents in a plurality of pockets includes a stacker having a tier of the plurality of pockets and two magazines positioned at the same end of the stacker. A first transport and a second transport are operably associated with the first magazine and the second magazine, respectively, and are adapted to carry the documents through the stacker. The method includes separating the documents into a first portion and a second portion, the first portion being carried by a first transport through a first end of a stacker, the second portion being carried by a second transport and through a second end of the stacker, and merging the second portion with the first portion.

20 Claims, 9 Drawing Sheets

(56) References Cited

U.S. PATENT DOCUMENTS

| | | | | |
|---|---|---|---|---|
| 2007/0084764 | A1 | 4/2007 | Benninger | |
| 2007/0209976 | A1 | 9/2007 | Worth et al. | |
| 2008/0041770 | A1 | 2/2008 | Mileaf et al. | |
| 2008/0060980 | A1 * | 3/2008 | Inman et al. | 209/509 |
| 2009/0014364 | A1 * | 1/2009 | Conard et al. | 209/584 |

OTHER PUBLICATIONS

Issue Notification dated Mar. 20, 2012 from U.S. Appl. No. 12/583,310.

Amendment dated Sep. 15, 2011 from U.S. Appl. No. 12/583,310.

Notice of Allowance dated Nov. 18, 2011 from U.S. Appl. No. 12/583,310.

* cited by examiner

DOCUMENT SORTING MACHINE

BACKGROUND

1. Field of the Invention

The present invention relates generally to machines utilized to sort documents, i.e., mail pieces such as letters, and more particularly, to a sorting machine having dual magazines located at one end for increasing sorting capacity.

2. Description of Related Art

Automated sorting machines are well known in the art for sorting large volumes of documents (e.g. letters, postcards, checks, flats, and the like) into groups having a common identifying criteria (e.g. Zip Codes, mail boxes, and so forth). A sorting machine typically comprises a front end or feeder section and one or more stacker sections, wherein the front end feeds the documents, one-by-one, past a reader (e.g. optical character reader ("OCR"), bar code reader ("BCR"), or the like) to a transport that carries it to a designated sort pocket in one or more stacker sections.

As the document passes the reader, the desired criteria on the document is read and a signal is generated that, in turn, is processed to generate a designation signal for that particular document. This designation signal, in turn, triggers a diverter or gate at the designated pocket in the stacker section as the document approaches to divert the piece from the transport into the designated pocket where it is stacked with other pieces having the same identifying criteria. Such machines are well known and are commercially available e.g., Vsort® Fiat Sorting machine, NP8000™ Sorting machine, both manufactured and distributed by National Presort, Inc., Dallas, Tex.

Many present sorting machines are comprised of a plurality of vertically stacked tiers of sort pockets which increase the number of pockets available during the sorting operation without substantially increasing the machine's foot print (floor area required for the machine). With these types of sorting machines, the letters are read and directed by a Level Distribution Unit or elevator system to the particular tier on which its respective sort pocket is located. For example, if the sorting machine has four tiers, only approximately 25% of the letters being fed will go to each tier. This means that approximately 75% of the sort capacity of each tier goes unutilized. It can be seen that if the unused capacity on each tier can be reduced, the throughput of the machine can be significantly increased.

Although the foregoing developments represent strides in the area of sorting machines, many shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
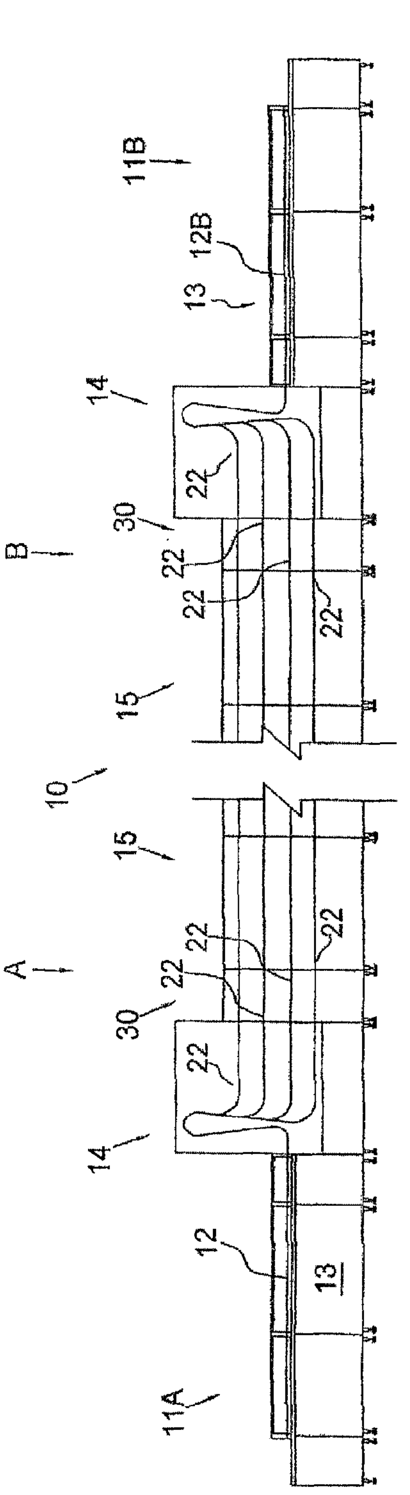
FIG. 1 is a simplified side view of the sorting machine of the present invention can be incorporated.

While the sorting machine and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

The document sorting machine of the present application overcomes common disadvantages associated with conventional machines and method for sorting documents. Illustrative embodiments are described below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring more particularly to the drawings, FIG. 1 is a plan view of a multi-tiered, document sorting machine 10 in accordance with the present invention. As seen in FIG. 1, machine 10 comprises of two halves A and B which are substantially identical in form and function. For the sake of clarity, only one half will be described in detail. Each half (A and B) is comprised of a feeder section 11, a transport 12, a serpentine piggy-backing section 13, and elevator or Level Distribution Unit (LDU) 14, and multi-tiered stacker section 15.

Figure 2:
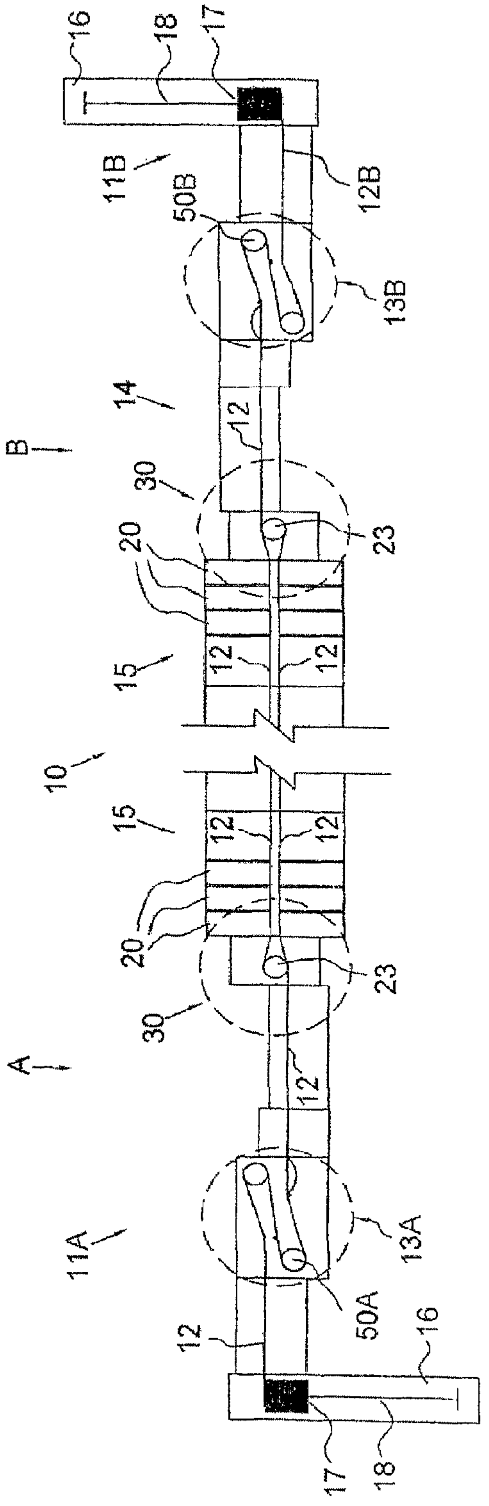
FIG. 2 is a top view of the sorting machine shown in FIG. 1.

Each half (A and B) comprises of a feeder section 11 having a magazine 16 (see FIG. 2) onto which a batch of documents (e.g., letters or pieces 17) are positioned (see FIG. 2). Conveyor 18 (e.g., motor driven chain-link belts) feeds documents 17 forward onto a pickoff which picks off one document at a time and delivers it onto transport 12. As the document passes by optical character reader and/or bar code reader (not shown), an identifying mark (e.g. a sort code such as a Zip Code or bar code, respectively) on the document 17 is read by the appropriate reader which, in turn, generates a signal representative of the mark as is well known in the art. These signals are then processed to direct the document through LDU 14 to its pre-assigned sort pocket on one of tiers 22 in stacker section 15.

Figure 3:
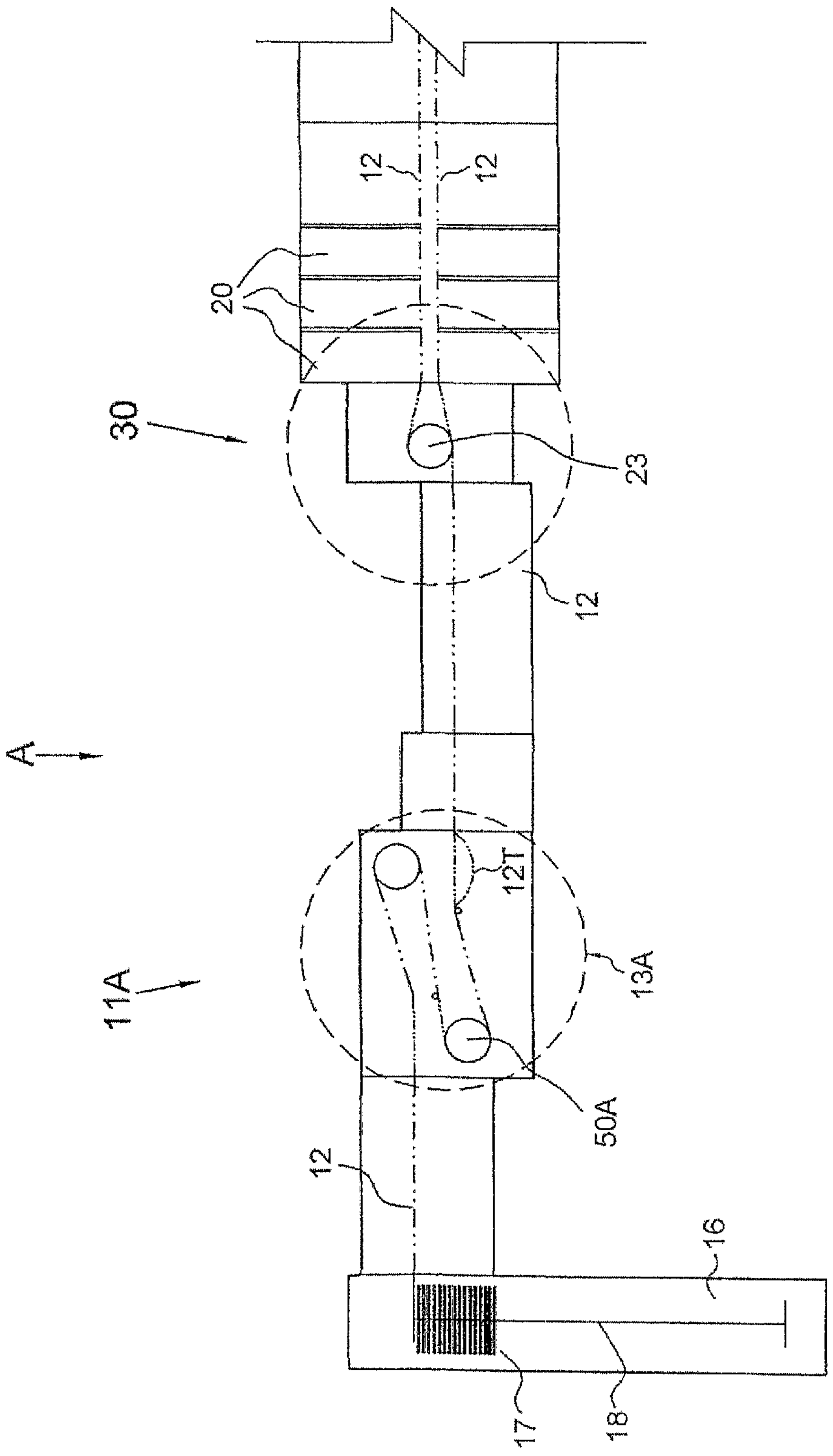
FIG. 3 is an enlarged view of one end of the sorting machine of FIG. 1.

Stacker section 15 is shown as being comprised of a plurality (e-g. four) of vertically stacked tiers 22, each tier being substantially identical to the others. Each tier 22 has a plurality of horizontal stacker bins or "pockets" 20 (only some shown and numbered for clarity) arranged in pairs having one pocket on either side of the looped transport 12. As best seen in FIGS. 2 and 3, transport 12 on each tier 22 forms a continuous path or "carousel" which extend through both the adjacent stacker sections 15 of both A and B. That is, transport 12 passes around a "turn around" pulleys 23 at the opposite ends of the respective stacker sections so that a document may be carried along one side of the sort pockets, turned around, and then back along the other side of the sort pockets until the document reaches its designated pocket. While only two stacker sections are shown, it should be recognized that there may be more than two section aligned with each other or the two sections shown may be combined into a single stacker section without departing from the present invention.

Each pocket 20 has a diverter means (see **21*a* in FIG. 4; not shown in other Figures for the sake of clarity) which is actuated as a designated document 17 approaches its pocket. The diverter, when activated, temporarily intersects the centerline of transport 12 to thereby divert document 17 from transport 12 into its designated pocket 20**. This type of operation is well known in commercially-available sorting machines; e.g., Models NP8000, Vsort®, and OMEGA® Mail Sorters, manufactured and distributed by National Presort, Inc., Dallas, Tex.

While the machine 10 will be shown and described as having four tiers 22, it should be recognized that more or less tiers (i.e., at least one) can be used without departing from the present invention. It will also be recognized, in most operations using multi-tiered sorting machines, the sorting of the mail will be programmed to arrange the sort pockets so that each tier will receive approximately an equal amount of the documents. For example, in a four-tier machine, the designated pockets for a particular batch of documents will be assigned so that approximately 25% of the documents will be fed to each tier, leaving appropriate 75% of the available transport capacity of that tier unused.

In accordance with the present invention, dual feeders 11 are provided to feed documents onto transport 12 from opposite ends of the sorting machine 10. That is, one feeder 11A reads and feeds documents from one end of the sorter 10 through its respective LDU 14 to each of the four tiers 22 while, at the same time, feeder 11B reads and feeds documents from the other end of the elongated sorting machine 10.

As described above, documents 17 are fed from either feeder 11A or 11B and may have to travel almost all of the way around the looped transport 12 of a respective tier 22 in order to reach a designated pocket 20 which lies on the other side of the stacker section from which the document it entered the transport. In order to do this, that document must completely travel through both stacker sections 15 along one side of the tier and then reverse directions at "turn around" pulley 23 in a respective buffer unit 30 before it can travel along the other side of the tier to reach its designated pocket.

Since documents 17 are being fed simultaneously from both feeders 11A and 11B onto respective ends of the respective common looped transport 12 of each respective tier 22, there is a real possibility that a document from one of the feeders and already in the transport may collide with a document being fed onto the transport by the other feeder; thereby causing a collision between the two documents. Any such collisions can result in a shut-down of sort operations. To prevent this from happening, a buffer unit 30 is provided at each end of each tier 22. Since the buffer units 30 are identical, only the unit at one end (i.e. 30B) will be described in detail.

Figure 4:
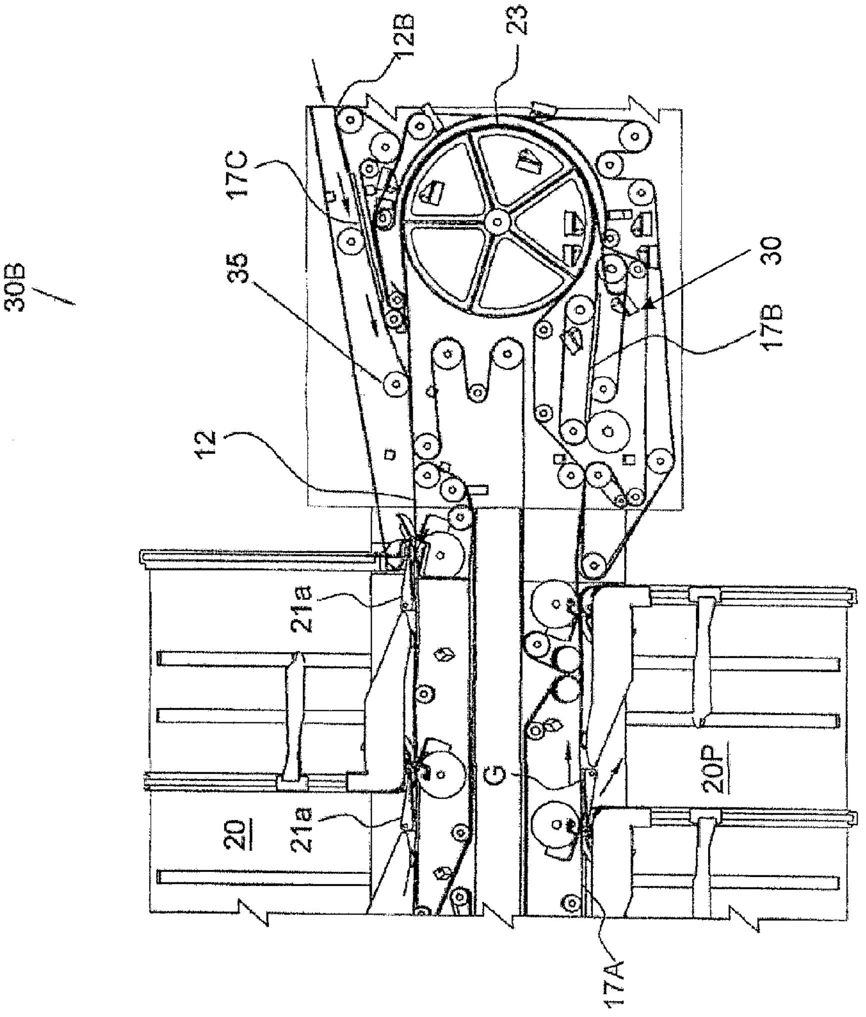
FIG. 4 is an enlarged, top view of the buffer unit at each end of each tier of the sorting machine of FIG. 1.

As best seen in FIG. 4, buffer unit 30B includes transport 12B that feeds document 17C from feeder 11B into the looped or carousel transport 12 at one end of a respective tier 22. To prevent document 17C from colliding with document 17B already on transport 12 (e.g., one which has been fed from feeder 11A), a sensor(s) (not shown) along transport 12 determines when document 17B is likely to arrive at the merge point 35 at the same time as document 17C will enter transport 12. If the possibility of collision is imminent, document 17B is held in buffer unit 30 until document 17C enters transport 12 at point 35, at which time, document 17B is released to resume normal operation.

If a following document 17N is positioned on transport 12 so that it might run up onto the documents 17B as it is being delayed in unit 30, gate G is actuated to divert document 17B into a "purge" pocket 20P. Any documents in purge pocket 20P are then removed and ran back through sorting machine 10 to sort them into their proper packets. This allows both feeders to continue to feed documents without interruption.

Figure 5:
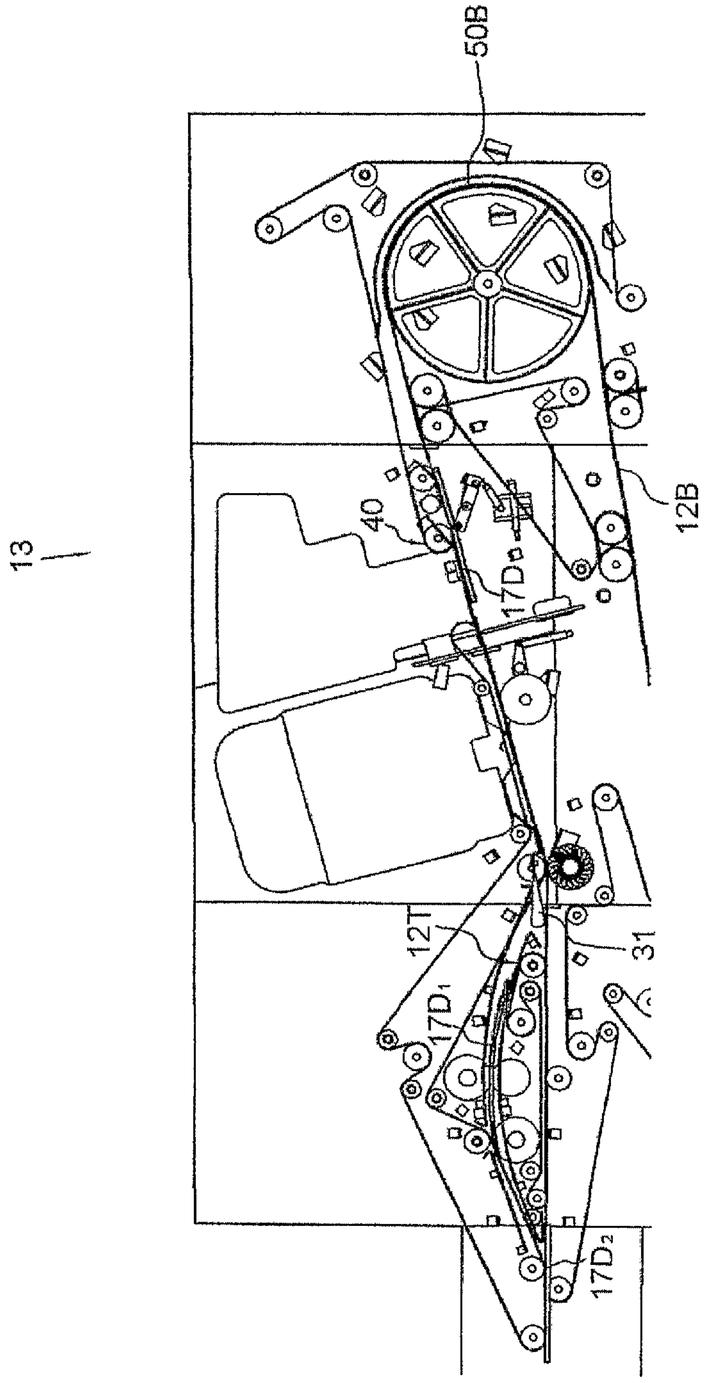
FIG. 5 is an enlarged, top view of the serpentine "piggy-backing" section at each end of the sorting machine of FIG. 1.

Another feature of the present invention is serpentine piggy-back unit 13 (FIG. 5). The function of this unit is to stack, or "piggy-back" consecutive documents going to the same designated pocket whose combined thicknesses are equal to or less than a predetermined thickness. Stacking such documents is highly beneficial since it reduces the number of times a gate at a particular pocket has to be actuated during the sort operation. Also, the piggy-backing of these documents leaves a gap on the transport which is also beneficial in merging the documents from the dual feeders.

In the operation of serpentine, piggy-back unit 13, the thickness of each document 17D (FIG. 5) is measured by any known thickness measuring device 40 as it passes through serpentine unit 13. Such devices are well known in the art and are available from several commercial sources. If the thickness of document 17D equals or exceeds a predetermined thickness, it passes on through unit 13 to its designated pocket in the stacker section. However, if the combined thicknesses of any two consecutive, adjacent documents 17D (i.e., documents going to the same sort pocket) is equal to or less than the predetermined thickness, the first document 17$D_1$ is diverted into by-pass transport 12T by gate 31 and is temporarily held at that point.

When the following document 17$D_2$ (which is going to the same pocket as document 17$D_1$) approaches the exit of bypass transport 12T, document 17$D_1$ is fed (i.e., piggy-backed) onto document 17$D_2$. The two stacked documents will now travel along transport 12 as if a single document until it reaches its designated pocket 2nd is sorted accordingly. It should be appreciated that the unit 13 could easily be adapted to piggy-back multiple documents together, i.e., three or more documents traveling to the same designated pocket.

Figure 6:
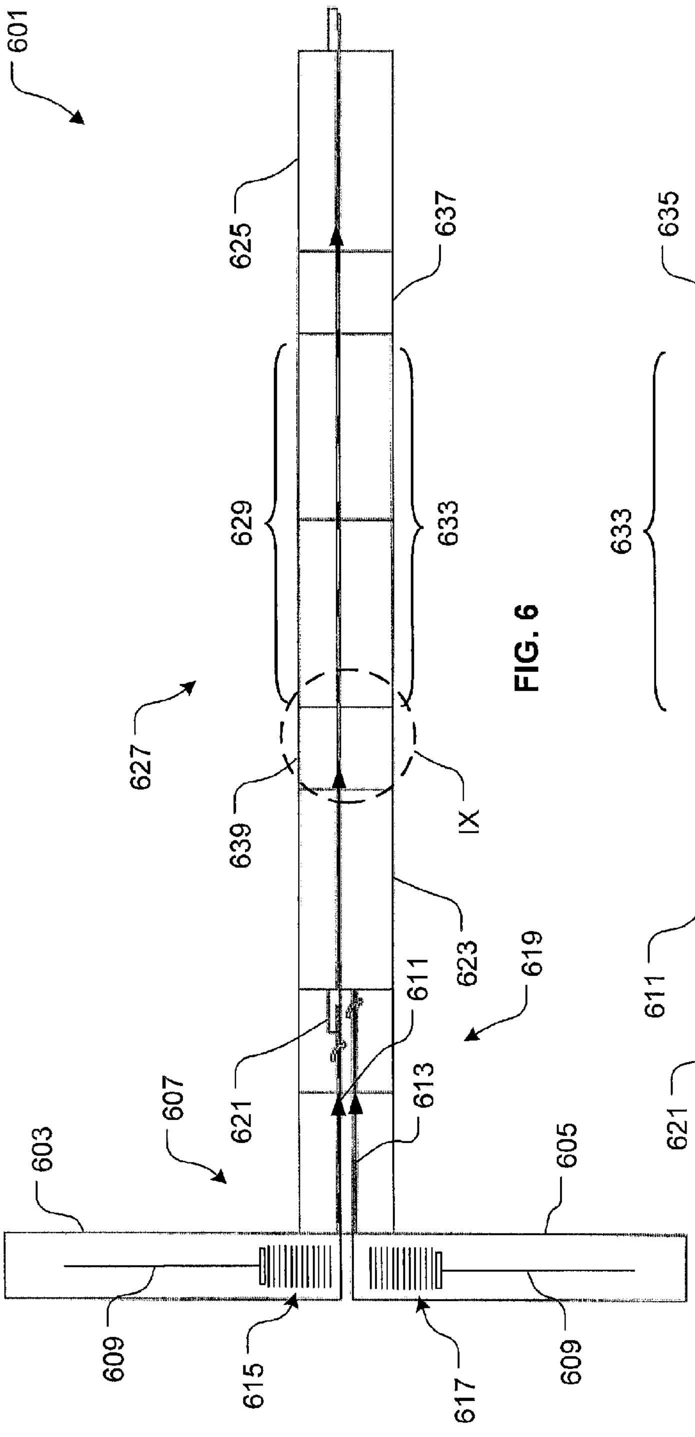
FIG. 6 is a top view of an alternative embodiment of a sorting machine of the sorting machine of FIG. 1.
Figure 7:
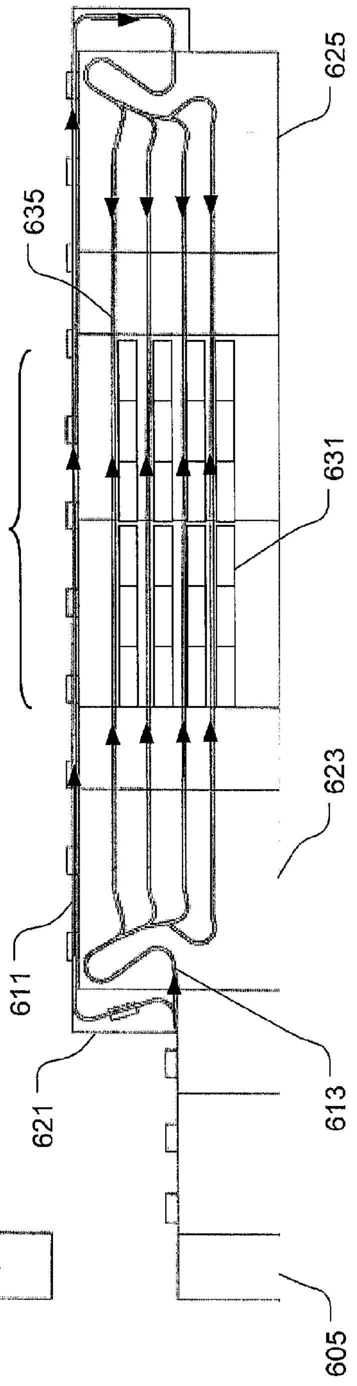
FIG. 7 is side view of the sorting machine of FIG. 6.

Referring now to FIGS. 6 and 7 in the drawings, respective top and side views of an alternative embodiment of sorting machine 10 is shown. Sorting machine 601 is substantially similar in function to sorting machine 10. In particular, sorting machine 601 is utilized to sort documents in a plurality of sorting pockets. Sorting machine 601 comprises one or more of the various systems discussed above, i.e., a feeder section, transport, level distribution unit, stacker section, and other required systems, to effectively and rapidly sort documents. It will be appreciated that sorting machine 601 could include one or more of the features of sorting machine 10, and likewise, sorting machine 10 could easily be adapted with the features of sorting machine 601.

Sorting machine 601 includes a first magazine 603 and a second magazine 605, both magazines being located at the same end section 607 of sorting machine 601, and both magazines being substantially similar in form and function to magazine 16, discussed above. Magazine 603 and magazine 605 include a conveyor 609 for feeding documents onto a pickoff (not shown), which in turn, picks off one document at a time and delivers the document to a transport. In the preferred embodiment, a first transport 611 is operably associated with magazine 603 and a second transport 613 is operably associated with magazine 605. During operation, a worker places documents 615 on magazine 603 and documents 617 on magazine 605, which in turn are fed to and subsequently carried by respective transport 611 and transport 613. For clarity, movement of both transport 611 and transport 613 are depicted with arrows on sorting machine 601. The selectively positioning of both magazine 603 and magazine 605 at the same end section 607 allows a single worker to feed both transports simultaneously, thus reducing costs associated with employing multiple workers to perform the same job.

Sorting machine 601 preferably includes an elevator 621 utilized to elevate transport 611 at a height above a first level distribution unit 623 such that uninterrupted travel of documents 615 is achieved between feeder section 619 and a second level distribution unit 625. During operation, documents 615 from magazine 603 are fed through feeder section 619 and are carried by transport 611 above first level distribution unit 623 via elevator 621 to second level distribution unit 625. Thereafter, documents 615 are placed in the stream of partially sorted documents 617 from magazine 605. This feature greatly increases sorting efficiency, as is further discussed below.

Like sorting machine 10, sorting machine 601 comprises a stacker section 627 comprising a first section 629 having a plurality of pockets 631 and a second section 633 having a plurality of pockets 631. In the preferred embodiment, stacker section 627 comprises two or more tiers 635, preferably four tiers, to increase sorting capacity. However, it will be appreciated that alternative embodiments could include more or less tiers than the preferred embodiment.

It should be understood that a designated pocket for some of documents 617 could be positioned on section 629, thus requiring documents 617 to travel the entire length of section 629 then reverse direction at a first buffer unit 637 prior to documents 617 traveling along section 629 to the designated pocket. Sorting machine 601 further comprises a second buffer unit 639 utilized to maintain continuous travel of both documents 615 and documents 617 around section 629 and section 633, thus forming a continuous "loop" around stacker 627. As documents 617 travel around first buffer unit 637, documents 615 from magazine 605 are added thereto via transport 611. This feature increases the efficiency of sorting machine 601 by placing documents 615 in a stream of documents 617 already sorted in section 633. It should be understood that the remaining unsorted documents 617 have designated pockets located on section 629 of stacker 627, thereby requiring the unsorted documents to travel the entire length of section 633 and reverse direction at first buffer unit 637. Sorting documents 617 prior to merging documents 615 creates additional openings on transport 613 for receiving documents 615, which in turn increases the sorting capacity of the documents and overall efficiency of sorting machine 601.

Figure 8:
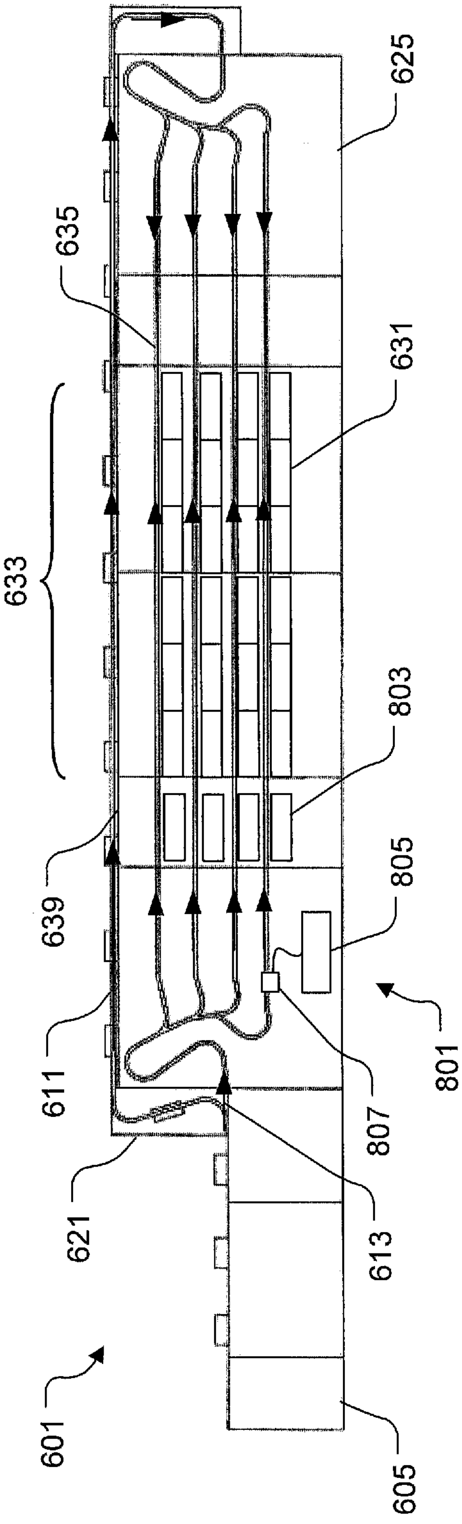
FIGS. 8 and 9 are side views of the sorting machine of FIG. 6 with a purge system.
Figure 9:
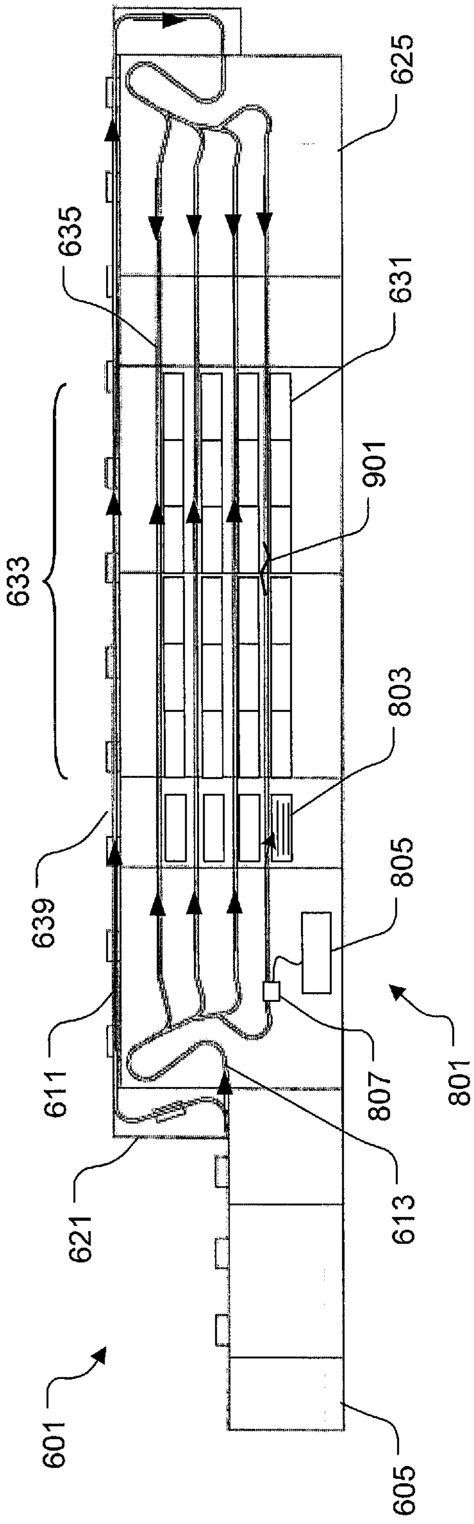

Referring to FIGS. 8 and 9 in the drawings, side views of sorting machine 601 are shown with a purge system 801. Purge system 801 is utilized to remove documents 615 and documents 617 from their respective transports in one or more scenarios, including, but not limited to, the documents risk colliding with one another, the documents have an unknown pocket designation, and/or a jam occurs, which requires the tier to shut down for repair. Purge system 801 comprises one or more of a purge pocket 803 for storing the documents removed from the transport and an associated control system 805, i.e., a sorter/supervisor board adapted to direct documents to pocket 803 during one or more of the foregoing scenarios.

Purge pocket 803 is preferably operably associated with turn around buffer unit 639; wherein, as one or the foregoing purge scenarios described above occurs, control system 805 activates a diverter means 1001 (see FIG. 10), i.e., a gate, which in turn diverts documents 615 and documents 617 from transport 613 to pocket 803 for storing. After the jammed tier is fixed, control system 805 deactivates diverter means 1001 and the documents continue to their designated pocket. Thereafter, a worker collects the documents from pocket 803 and returns the unsorted documents to the magazine for resorting. In the preferred embodiment, pocket 803 is positioned next to turn around buffer unit 639. However, it will be appreciated that alternative embodiments could include one or more purge pockets 803 selectively positioned at various locations on sorting machine 601. For example, a purge pocket 803 could be position alongside pockets 631 of stacker 627 and/or one or more pockets 631 could be reserved as purge pockets.

Control system 805 is operably associated with a plurality of sensors 807 utilized to determine whether a jam 901 on the tier has occurred. If a jam does occur, control system 805 shuts down all sorting on the jammed tier and is adapted to activate controls, lever, motors, buffers, diverters, and other associated equipment utilized to direct the documents to purge pocket 803. FIG. 9 provides illustration of a jammed tier 635, which is shut down and the documents diverted to purge pocket 803. It will be appreciated that while the jammed tier is shut down, the other remaining 7 tiers (4 tiers on section 629 and 3 tiers on section 633) remain operable.

Purge system 801 greatly increases sorting efficiency of sorting machine 601, in particular, purge system 801 enables sorting machine 601 to shut down a single tier in lieu of shutting down all tiers, thus allowing sorting machine 601 to remain operable. In the preferred embodiment, a single tier is shut down; however, it should be appreciated that alternative embodiments could include a purge system adapted to shut down one or more jammed pockets on a tier in lieu of shutting down the entire tier. This alternative embodiment enables the remaining pockets on the tier to operate while the jammed pocket(s) are undergoing maintenance. Furthermore, the preferred embodiment includes a purge pocket for each tier; however, it should be appreciated that alternative embodiments could include a single purge pocket adapted to store documents for all tiers and/or a designated tier utilized as a purge pocket. For example, section 633 could include a fifth tier having a plurality of pockets and being utilized as designated purge tier in lieu of a single purge pocket 803.

Figure 10:
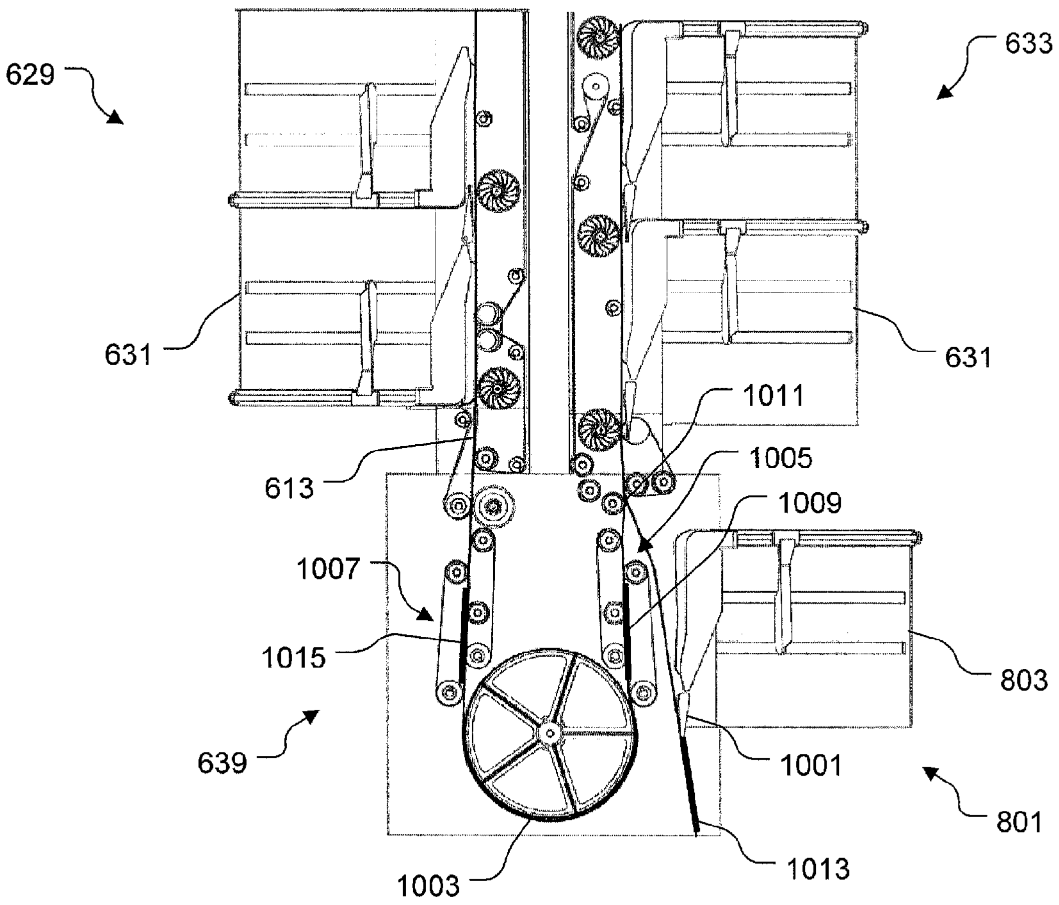
FIG. 10 is a top view of a buffer unit and the purge system of the sorting machine of FIG. 6.

Referring now to FIG. 10 in the drawing, a top view of buffer unit 639 and purge system 801 are shown. Buffer unit 639 includes a pulley 1003 utilized to turn around transport 613 such that continuous travel of transport 613 is achieved between buffer unit 637 and a pulley (not shown) of buffer unit 639. Buffer unit 639 is further optionally provided with a first buffer 1005 and a second buffer 1007, both buffers being utilized to prevent documents on the transport from colliding with each other. In the preferred embodiment, both buffer 1005 and buffer 1007 utilize one or more servomotors adapted to hold the documents in position. However, it should be appreciated that alternative embodiments could include solenoids and/or other suitable stopping means, i.e., suction devices, in lieu of the preferred embodiment. Solenoids are particularly desirable because they reduce the amount of starting and stopping of the transport belt. Also, it should be appreciated that alternative embodiments could include a buffer unit adapted to provide controlled collision of the documents.

During operation, one or more sensors (not shown) along transport 613 determines whether a document 1009 is likely to arrive at a merge point 1011 at the same time as an entering document 1013. If the possibility of collision is imminent, document 1009 will be held in position with buffer 1005 until document 1013 passes merge point 1011, at which time, document 1009 is released to resume travel to the designated sorting pocket 631. Likewise, second buffer 1007 is utilized in a similar manner, namely, one or more sensors determine whether collision of a document 1015 is imminent with document 1009, and if so, buffer 1007 holds document 1015 in position until document 1009 is released. The dual buffer configuration reduces collision between two or more documents on the transport, which increases the overall efficiency of the sorting operation. It should be appreciated that additional buffers could be utilized in alternative embodiments. For example, a buffer could be selectively position between first buffer 1005 and second buffer 1007, thereby allowing an additional document to be held in position if collision is imminent.

Figure 11:
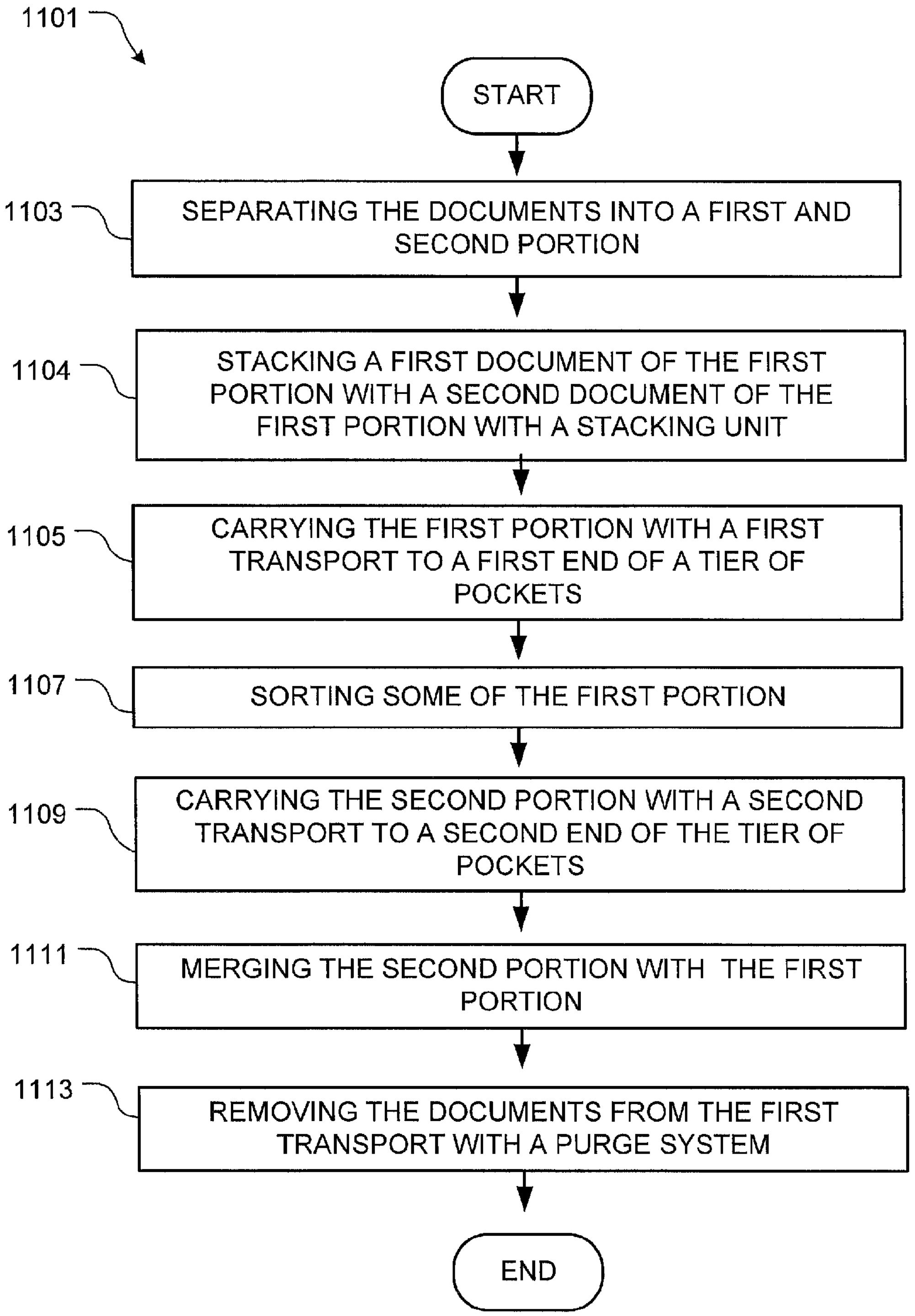
FIG. 11 is a plot diagram depicting a preferred method to sort documents.

Referring to FIG. 11 in the drawings, a flow chart 1101 illustrating the preferred method of sorting documents is shown. Box 1103 depicts the first step, which includes separating the documents into a first portion and a second portion. Thereafter, the first portion is carried to a first end of a tier of pocket and subsequently sorted, as depicted in boxes 1105 and 1107. The second portion is simultaneously carried to a second end of the tier of pockets and then merged into the stream of already partially sorted documents from the first portion, as depicted in boxes 1109 and 1111. The preferred embodiment also includes the process of removing the documents from the first transport with a purge system, as described above, and as depicted in box 1113. Also, the preferred embodiment includes the process of stacking the document on one another with a stacking unit, as described above, and as depicted in box 1115.

Figure 13:
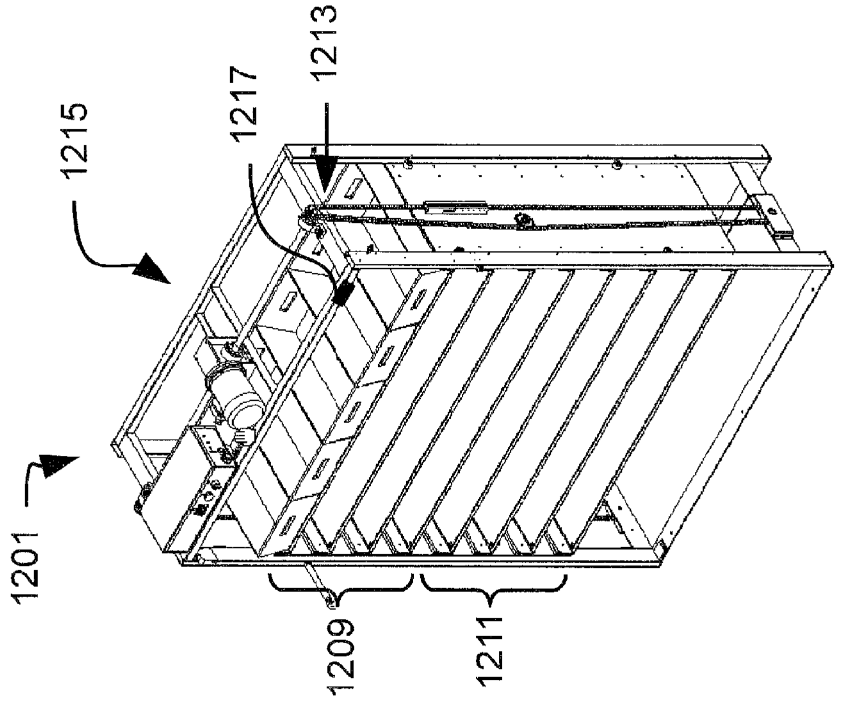
FIGS. 12 and 13 are oblique view of a tray system operably associated with the sorting machine of FIG. 6.
Figure 12:
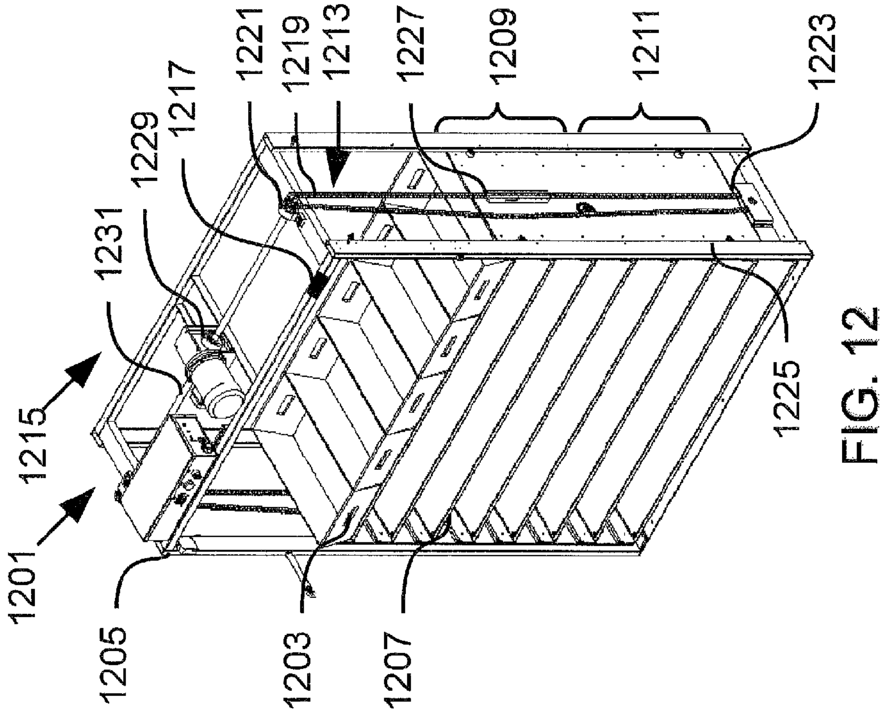

Referring now to FIGS. 12 and 13 in the drawings, oblique view of a tray system 1201 is shown. Tray system 1201 is utilized to store documents that are removed from stacker section 627 as pockets 631 become full and/or during changing of schemes, as is further discussed below. In operation, a worker collects documents from the pockets and places the documents in a corresponding removable tray 1203 carried by tray system 1201. Thereafter, the worker removes tray 1203 as tray 1203 becomes full and replaces tray 1203 with an empty tray. It should be understood that each tray 1203 carried by tray system 1201 corresponds to a pocket on stacker section 627. For example, tray system 1201 could include twenty trays 1203, each tray being designated to store documents from twenty different pockets of stacker section 627.

Tray system 1201 preferably comprises a framed structure 1205 for supporting the plurality of trays 1203 and for supporting associated subsystems operably associated with tray system 1201. In the preferred embodiment, tray system 1201 comprises eight rows 1207 for holding five trays 1203; however, alternative embodiments could include more or less rows 1207 and rows adapted to hold more or less trays than the preferred embodiment. Tray system 1201 includes four rows 1207 designated for a first scheme section 1209 and four rows 1207 designated for a second scheme section 1211. It should be understood that sorting machine 601 could easily be adapted to operate with multiple schemes. Schemes are defined as operating scenarios, in particular, a first scheme occurs when sorting machine 601 sorts international documents, and a second scheme occurs when the documents are nationally sorted. For example, a first collection of documents could include designations to a plurality of countries, thereby designating a pocket 631 to individual countries; whereas, in the second scheme, each pocket could be designated for each state within the United States. Of course, it should be understood that these two exemplary schemes are one example of many different types of schemes operably associated with sorting machine 601. It should be appreciated that alternative embodiments could include more or less schemes than the preferred embodiment. Providing a tray system with multiple scheme sections greatly increases the overall efficiency of tray system 1201, namely, the worker is no longer required to remove trays from the tray system as the sorting machine switches between schemes.

Tray system 1201 further comprises a lift subsystem 1213 operably associated with a drive system 1215. Lift subsystem 1213 is utilized to lower and raise rows 1207 relative to the floor. For example, FIG. 12 shows rows 1207 at a lower position, while FIG. 13 shows rows 1207 at an elevated position. During operation, a worker manipulates a switch 1217, which in turn activates drive subsystem 1215 and lift subsystem 1213. Switch 1217 can subsequently be manipulated by the worker to lower rows 1207 to the lower position. This feature of raising and lowering the rows provides ergonomic advantageous, specifically, a worker is no longer required to bend over to reach and stack documents near the floor. In the preferred embodiment, the worker simply manipulates switch 1217 to elevate the bottom rows for stacking.

Lift subsystem 1213 preferably comprises one or more of a chain 1219 rotatably coupled to a top gear 1221 and a bottom gear 1223. Rows 1207 are securely held in position with a rigid sidewall 1225, which includes one or more brackets 1227 adapted to fasten to chain 1219. Drive subsystem 1215 preferably includes a motor 1229 rotatably coupled to a drive shaft 1231, which in turn is rotatably coupled to gear 1221. During operation, drive subsystem 1215 rotates gear 1221, which in turn causes rows 1207 to raise or lower via movement of chain 1219. Of course, it will be appreciated that alternative embodiments could include different means for lifting the rows. For example, the tray system could easily be adapted with a worm gear system, a hydraulic system, gear system, and/or other suitable systems adapted to lower and raise an object.

It is apparent that a sorting machine with significant advantages has been described and illustrated. In particular, the sorting machine effectively and rapidly sorts documents by providing two transports, the first transport utilized to carry documents through a plurality of sorting bins and a second transport utilized to merge documents into the stream of documents already partially sorted with the first transport. This features enables both a first magazine operably associated with the first transport and a second magazine operably associated with the second transport to be position at the same end section of the sorting machine, thus enable a single worker to feed both magazines simultaneously, which in turn allows a single worker to feed documents into the sorting machine in lieu of multiple workers performing the same job. Further, the sorting machine is adapted with a purge system, which allows documents to be removed from the machine, thus enabling the sorting machine to continue operation while the jammed tier is being repaired.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present embodiments are shown above, they are not limited to just these embodiments, but are amenable to various changes and modifications without departing from the spirit thereof.

What is claimed is:

1. A machine to sort documents, comprising:

an elongated stacker section having:

a first end and a second opposing end; and a first tier extending from the first end and the second opposing end, the first tier having:

a plurality of pockets, the pockets being adapted to store the documents;

a first magazine and a second magazine, both the first magazine and the second magazine being positioned at the first end of the elongated stacker;

a first transport operably associated with the first magazine, the first transport being adapted to carry documents to the plurality of pockets through the first end of the stacker;

a second transport operably associated with the second magazine, the second transport being adapted to carry documents to the plurality of pockets through the second opposing end of the stacker; and a feeder operably associate with the first magazine and the second magazine;

wherein the first magazine feds documents through the feeder to the first transport and the second magazine feds documents through the feeder to the second transport.

2. The machine of claim 1, further comprising:

a second tier extending from the first end and the second opposing end, the second tier having:

a plurality of pockets, the pockets being adapted to store the documents.

3. The machine of claim 2, further comprising:

a first level distribution unit at the first end of the stacker, the first level distribution unit being adapted to distribute documents between the first tier and the second tier; and a second level distribution unit at the second end of the stacker, the second distribution unit being adapted to distribute document between the first tier and the second tier;

wherein the first transport is adapted to carry documents from the first magazine to the first level distribution unit; and wherein the second transport is adapted to carry documents from the second magazine to the second level distribution unit.

4. The machine of claim 3, further comprising:

an elevator operably associated with the second transport, the elevator being adapted to elevate the second transport at a height above the first level distribution unit.

5. The machine of claim 1, further comprising:

an buffer unit operably associated with the first transport, the buffer unit being adapted to prevent collision between one or more of the documents carried by the first transport.

6. The machine of claim 5, the buffer unit comprising:

a turn-around pulley adapted to redirect the traveling direction of the first transport;

a first buffer positioned downstream of the turn-around pulley, the first buffer being adapted to hold a first document in position in the likely event of a collision between the first document and a second document upstream of the merge point.

7. The machine of claim 6, the buffer unit further comprising:

a second buffer positioned upstream of the turn-around pulley, the second buffer being adapted to hold a third document in position in the likely event of a collision between the third document and the second document.

8. The machine of claim 1, further comprising:

a purge system operably associated with the first transport, the purge system being adapted to remove documents from the first transport.

9. The machine of claim 8, the purge system comprising:

a purge pocket operably associated with the first transport, the purge pocket being adapted to store documents being purged from the first transport.

10. The machine of claim 9, wherein a pocket of the plurality of pockets is designated as the purge pocket.

11. The machine of claim 9, the purge system further comprising:

a diverter means operably associated with the first transport, the diverter means being adapted to divert documents from the first transport to the purge pocket;

a control system operably associated with the diverter means, the control system being adapted to activate the diverter means to divert documents to the purge pocket.

12. The machine of claim 11, the purge system further comprising:

a sensor operably associated with the control system, the sensor being adapted to detect a jammed tier;

wherein upon detection of the jammed tier, the control system activates the diverter means to divert documents to the purge pocket.

13. The machine of claim 1, further comprising:

a document stacking unit operably associated with the first transport, the document stacking unit having:

a thickness measuring device adapted to measure the thickness of a first document and a second document carried by the first transport; and a bypass transport operably associated with the thickness measuring device, the bypass transport being adapted to receive and temporarily hold the first document;

wherein the first document is temporarily held by the bypass transport if the thickness is less than a predetermined thickness; and wherein the first document is returned to the first transport and stacked on the second document carried by the first transport if the second document has a thickness less than the predetermined thickness and if the second document is being carried to the same designated pocket.

14. The machine of claim 1, further comprising:

a tray system being adapted to store documents, the tray system having:

a first row of a plurality of removable trays associated with a first scheme;

a second row of a plurality of removable trays associated with a second scheme;

a lift subsystem operably associated with the first row and the second row, the lift subsystem being adapted to raise and lower the first row and the second row; and a drive subsystem operably associated with the lift subsystem, the drive subsystem being adapted to drive the lift subsystem;

wherein the tray system enables a worker to switch between the first row the second row as the machine operates between the first scheme and the second scheme.

15. A machine to sort document, comprising:

a stacker section having:

a first tier of pockets; and a second tier of pockets;

a transport operably associated with the stacker, the transport being adapted to carry documents to the first tier of pockets and the second tier of pockets; and a purge system operably associated with the transport, the purge system being adapted to remove documents from the transport, the purge system having:

a pocket positioned upstream of a merge point between a first document merging onto the transport and a second document already being transported on the transport;

wherein the purge system is configured to purge the first document into the purge pocket.

16. The machine of claim 15, the purge system comprising:

a first purge pocket operably associated with the first tier of pockets; and a second purge pocket operably associated with the second tier;

wherein the first purge pocket and the second purge pocket are adapted to store documents removed from the transport.

17. The machine of claim 15, the purge system comprising:

a purge pocket operably associated with the transport;

a diverter means adapted to divert documents from the transport to the purge pocket; and a control system operably associated with the diverter means, the control system being adapted to activate the diverter means to divert documents to the purge pocket.

18. The machine of claim 17, the purge system further comprising:

a sensor operably associated with the control system, the sensor being adapted to detect a jammed tier;

wherein upon detection of the jammed tier, the control system activates the diverter means to divert documents to the purge pocket.

19. A method to sort documents, comprising:

separating the documents into a first portion of documents and a second portion of documents;

carrying the first portion of documents with a first transport, the first transport being adapted to carry the first portion of documents through a first end of a tier of pockets;

sorting the first portion of documents in the tier of pockets;

feeding the first portion of documents and the second portion of documents through a feeder positioned at the first end;

carrying the second portion of documents with a second transport, the second transport being adapted to carry the second portion of documents through a second end of the tier of pockets; and merging the second portion of documents with a stream of already sorted documents from the first portion of documents.

20. The method of claim 19, further comprising:

removing one or more of the documents from the first transport with a purge system.

* * * * *

UNITED STATES PATENT AND TRADEMARK OFFICE

CERTIFICATE OF CORRECTION

PATENT NO. : 8,558,132 B2
APPLICATION NO. : 13/098064
DATED : October 15, 2013
INVENTOR(S) : Brent A. Daboub and Federico Ayala It is certified that error appears in the above-identified patent and that said Letters Patent is hereby corrected as shown below:

In the Claims:
Col. 9, Lines 9-31 should read

1. A machine to sort documents, comprising:
an elongated stacker section having:
a first end and a second opposing end; and
a first tier extending from the first end and the second opposing end, the first tier having:
a plurality of pockets, the pockets being adapted to store the documents;
a first magazine and a second magazine, both the first magazine and the second magazine being positioned at the first end of the elongated stacker;
a first transport operably associated with the first magazine, the first transport being adapted to carry documents to the plurality of pockets through the first end of the stacker;
a second transport operably associated with the second magazine, the second transport being adapted to carry documents to the plurality of pockets through the second opposing end of the stacker; and
a feeder operably associated with the first magazine and the second magazine;
wherein the first magazine feeds documents through the feeder to the first transport and the second magazine feeds documents through the feeder to the second transport.

Signed and Sealed this
Eleventh Day of February, 2014

Michelle K. Lee

Michelle K. Lee
*Deputy Director of the United States Patent and Trademark Office*